US012802414B2

(12) United States Patent
Jain et al.

(10) Patent No.: US 12,802,414 B2
(45) Date of Patent: Nov. 17, 2026

(54) GENERATING TRAINING DATA BASED ON GAZE CAPTURED AT A SOURCE LOCATION FOR TRAINING A REPLACEMENT MODEL

(71) Applicant: Maplebear Inc., San Francisco, CA (US)

(72) Inventors: Sonal Jain, Sunnyvale, CA (US); Julia Singer, San Francisco, CA (US); Helen Kuo, Piedmont, CA (US); Karuna Ahuja, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 237 days.

(21) Appl. No.: 18/891,284

(22) Filed: Sep. 20, 2024

(65) Prior Publication Data

US 2026/0087783 A1 Mar. 26, 2026

(51) Int. Cl.

*G06V 10/774* (2022.01)
*G06Q 30/0601* (2023.01)
*G06V 40/18* (2022.01)

(52) U.S. Cl.

CPC ....... *G06V 10/774* (2022.01); *G06Q 30/0631* (2013.01); *G06V 40/197* (2022.01)

(58) Field of Classification Search

CPC .... G06V 10/774; G06V 40/197; G06V 40/19; G06V 10/94; G06Q 30/0631; G06F 3/013; G06F 3/011; G06T 7/70; G06T 2207/30201; G02B 27/0093

See application file for complete search history.

(56) References Cited

U.S. PATENT DOCUMENTS

| | | | | |
|---|---|---|---|---|
| 2022/0005095 | A1* | 1/2022 | Kaehler | G02B 27/0172 |
| 2022/0114640 | A1* | 4/2022 | Pawar | G06N 20/00 |
| 2024/0289855 | A1* | 8/2024 | Balasubramanian | G06N 3/08 |
| 2024/0362696 | A1* | 10/2024 | Prasad | G06F 40/40 |
| 2025/0069723 | A1* | 2/2025 | Gulati | G16H 50/20 |

* cited by examiner

*Primary Examiner* — Abhishek Sarma
(74) *Attorney, Agent, or Firm* — Fenwick & West LLP

(57) ABSTRACT

An online system receives information captured by a gaze tracking device describing a gaze point of a user and video data captured within a source location, detects a location associated with a first item that matches the gaze point based on the received information, and determines the first item is not available at the source location based on the video data. The system receives a signal indicating the user collected a second item from the source location, determines the second item is a replacement for the first item, and generates a new training example indicating the second item is an acceptable replacement for the first item for the user. The system trains a machine-learning model to generate a score indicating whether a candidate item is an acceptable replacement for a target item for a user, in which the model is trained using training data that includes the new training example.

20 Claims, 6 Drawing Sheets

GENERATING TRAINING DATA BASED ON GAZE CAPTURED AT A SOURCE LOCATION FOR TRAINING A REPLACEMENT MODEL

BACKGROUND

Online systems may allow their users to place orders that are serviced on their behalf by pickers. The pickers may service the orders by driving to source locations, collecting items included in the orders, and delivering the orders to the users who placed the orders. Items that are not available at source locations may be replaced with similar items that the users who placed the orders are likely to find acceptable as replacements for the items that are not available.

To help pickers find acceptable replacements for items that are not available, the online systems may use machine-learning models that help to identify the replacements. These machine-learning models may be trained based on historical order data, such as information describing user satisfaction with replacements for items that were unavailable for previous orders. However, these machine-learning models may be inaccurate when the training data used to train the models include very few training examples for certain items (e.g., new items).

SUMMARY

In accordance with one or more aspects of the disclosure, an online system generates training data for a machine-learning model that scores candidate items as replacements for a target item for a user based on a user gaze point captured at a source location. More specifically, an online system receives information captured by a gaze tracking device describing a gaze point of a user and video data captured within a source location and detects, within the source location, an item location associated with a first item that matches the gaze point of the user based on the received information. The online system determines that the first item is not available at the source location based on the video data and receives a signal indicating that the user collected a second item from the source location. The online system determines that the second item is a replacement for the first item and generates a new training example for a training data set, in which the new training example indicates the second item is an acceptable replacement for the first item for the user. The online system then trains a machine-learning model to generate a score indicating whether a candidate item is an acceptable replacement for a target item for a particular user of the online system, in which the machine-learning model is trained using the training data set that includes the new training example.

By leveraging user gaze points captured at source locations indicating user intent to purchase items that are unavailable and information describing acceptable replacements for these items for various users, the online system is able to generate additional training examples. When used to train the machine-learning model, these additional training examples may improve the accuracy of the score output by the model indicating whether a candidate item is an acceptable replacement for a target item for a particular user, especially when existing training examples describing acceptable replacements for the target item for the user are scarce.

DETAILED DESCRIPTION

Figure 1:
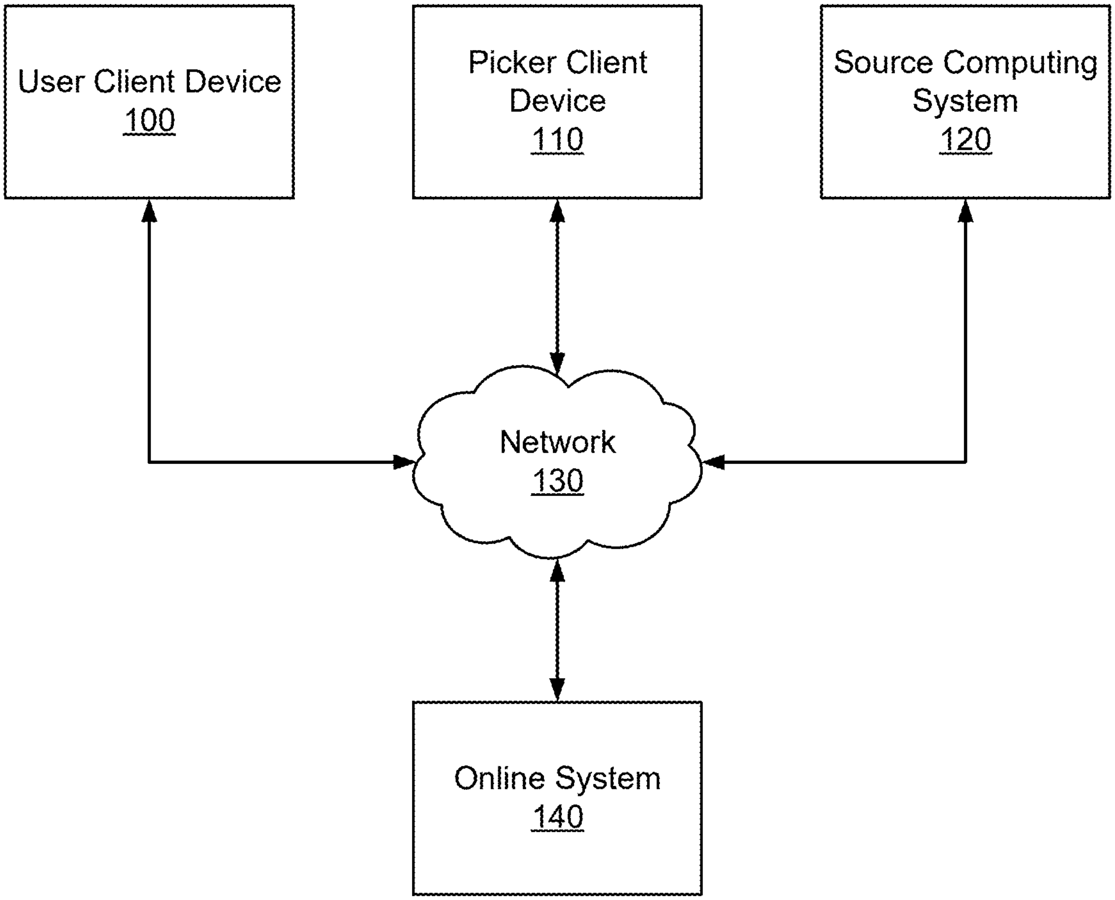
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 may be a personal or mobile computing device, such as a smartphone, a tablet, a laptop computer, or a desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, refers to a good or a product that may be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more source locations from which the ordered items should be collected.

The user client device 100 presents an ordering interface to the user. The ordering interface is a user interface that the user may use to place an order with the online system 140. The ordering interface may be part of a client application operating on the user client device 100. The ordering interface allows the user to search for items that are available through the online system 140 and the user may select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the items should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

In some embodiments, the user client device 100 communicates with or operates as a gaze tracking device (e.g., a headset) or any other suitable type of device capable of tracking a gaze of a user associated with the user client device 100. In such embodiments, the gaze tracking device may capture information describing a position and an orientation of one or both eyes of the user, image or video data depicting an environment of the user, or any other suitable types of information. The gaze tracking device may do so via one or more cameras included in the gaze tracking device or via any other suitable means. The gaze tracking device may track the gaze of the user based on the position and orientation of each eye, as well as the image or video data. For example, the gaze tracking device may determine a gaze line for each eye of a user based on a position and an orientation of the eye, such that the gaze line extends from the center of the eyeball, through the center of the pupil, and away from the user. In this example, the gaze tracking device may use the gaze lines for both eyes of the user to determine a gaze point of the user, such that the gaze point corresponds to a point in space depicted in an image or a video at which the gaze lines intersect, in which the image or video depicts an environment of the user. Alternatively, in the above example, if a gaze line for only one eye of the user may be determined, the gaze tracking device may use the gaze line to determine the gaze point of the user, such that the gaze point corresponds to a point in space depicted in the image or the video that intersects the gaze line.

The picker client device 110 is a client device through which a picker may interact with the user client device 100, the source computing system 120, or the online system 140. The picker client device 110 may be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source location. The picker client device 110 presents the items that are included in the user's order to the picker in a collection interface. The collection interface is a user interface that provides information to the picker identifying items to collect for a user's order and indicating the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source location, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker may use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may identify the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 provides instructions to a picker for delivering the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they may use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be a user client device 100 being operated by a user collecting items for themselves within the source location. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, a warehouse, or any other source location from which a picker may collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Furthermore, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission). In some embodiments, the source computing system 120 communicates with or operates as a gaze tracking device (e.g., a headset) or any other suitable type of device capable of tracking a gaze of a user. In such embodiments, the gaze tracking device may track the gaze of the user based on information describing a position and an orientation of one or both eyes of the user, image or video data depicting an environment of the user, etc. captured by the gaze tracking device, as described above.

The user client device 100, the picker client device 110, the source computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store source and the quantities of each of the groceries. The user's client device 100 transmits the user's order to the online system 140 and the online system 140 selects a picker to travel to the grocery store source location to collect the groceries ordered by the user. The online system 140 transmits an offer to the picker for the picker to service the order in exchange for consideration and, if the picker accepts the offer, the picker collects the groceries from the grocery store source location. Once the picker has collected the groceries ordered by the user, the picker delivers the groceries to a location transmitted to the picker client device 110 by the online system 140. The online system 140 is described in further detail below with regards to FIG. 2.

Figure 2:
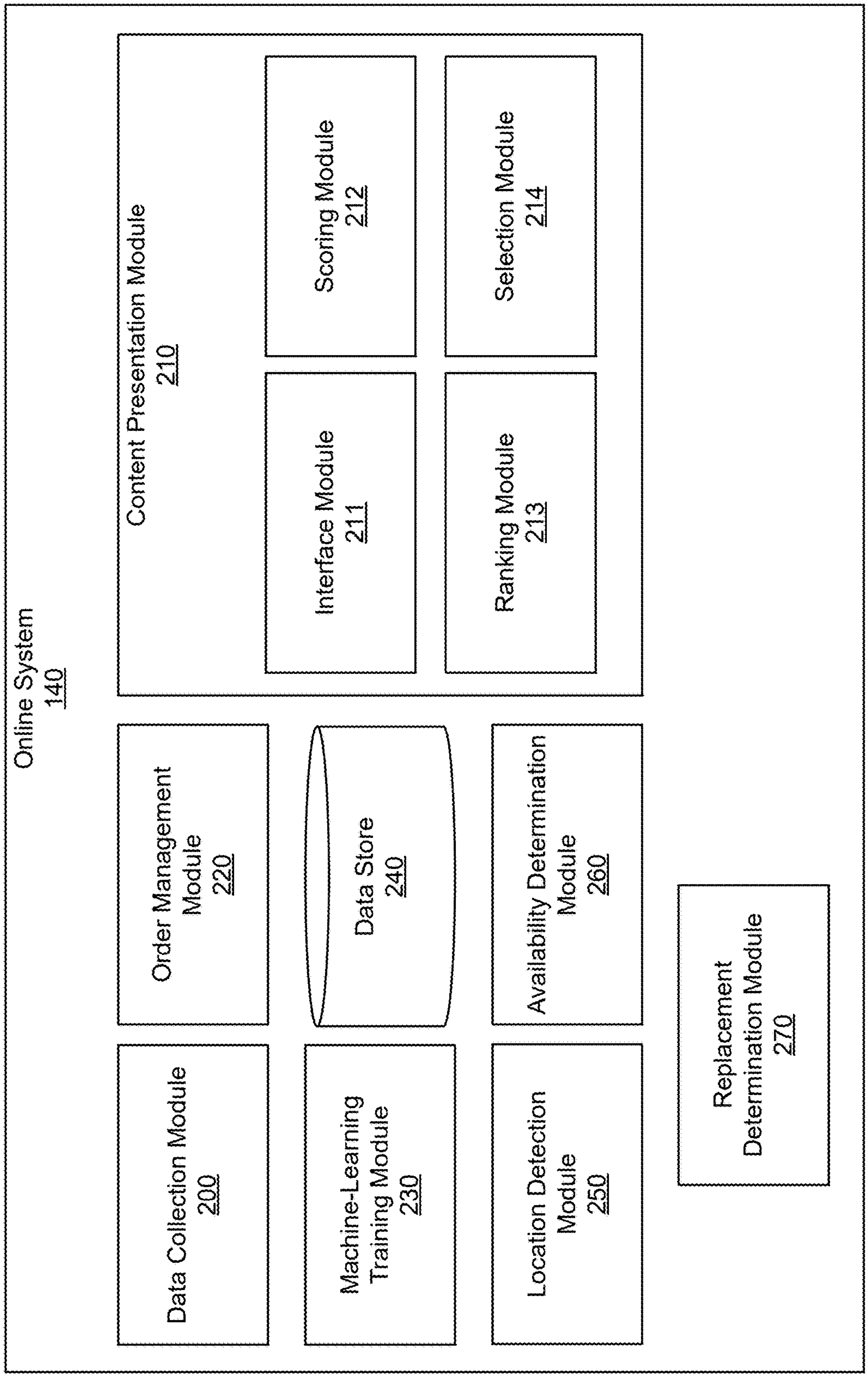
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, a data store 240, a location detection module 250, an availability determination module 260, and a replacement determination module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In one or more embodiments, the data collection module 200 collects data describing a user only if the user has previously explicitly consented to the online system 140 collecting data describing the user and using such data in one or more of the ways presented in this disclosure. Additionally, the data collection module 200 may encrypt all data, including sensitive or personal data, describing users.

The data collection module 200 collects user data, which is information or data that describe characteristics of a user. User data may include a user's name, address, preferences, (e.g., shopping or dietary preferences, favorite items, sources, source locations, or cuisines, etc.), or stored payment instruments. User data also may include demographic information associated with a user (e.g., age, gender, geographical region, etc.) or household information associated with the user (e.g., a number of people in the user's household, whether the user's household includes children or pets, etc.). The user data also may include default settings established by the user, such as a default source/source location, payment instrument, delivery location, or delivery timeframe. User data further may include information describing a gaze point of a user and image or video data captured within a source location by a gaze tracking device, in which the image or video data depict an environment of the user. The information describing the gaze point of the user and the image or video data may be stored in association with a time at which it was captured, information describing the user, information describing the source location, or any other suitable types of information. User data also may include information indicating whether an item is an acceptable replacement for another item for a user.

User data further may include historical information associated with a user, such as historical conversion or interaction information. For example, user data may include historical conversion information, such as historical order information describing previous orders a user placed with sources or historical purchase information describing previous purchases the user made for themselves from source locations. In this example, the historical order information may describe items included in each order (e.g., an item category, a size, a brand, a quantity, a price, etc. associated with each item), a time each order was placed, a source location from which the items included in each order were collected, etc. Similarly, in this example, the historical purchase information may describe items included in each purchase, a time each purchase was made, a source location from which each purchase was made, etc. As an additional example, user data may include historical interaction information describing each item with which a user interacted at a source location or each item presented by the online system 140 with which the user interacted and a type of each interaction (e.g., collecting an item, picking up an item, searching for an item, adding an item to an ordering list, etc.). Historical interaction information also may describe each item presented by the online system 140 with which a user did not interact. In the above example, the historical interaction information also may describe a time associated with each interaction (e.g., a time at which a search query for an item was received, a time an item was collected or added to an ordering list, etc.) and a time at which each item with which the user did not interact was presented to the user. The data collection module 200 may collect the user data from sensors on the user client device 100 or based on the user's interactions with the online system 140. The data collection module 200 also may collect the user data from other components of the online system 140, a gaze tracking device, a source computing system 120, a third-party system (e.g., a website or an application), or any other suitable source.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), serial number, price, promotion, item category, brand, quality (e.g., freshness, ripeness, etc.), ingredients/materials, manufacturing location, version/variety (e.g., flavor, low fat, gluten-free, organic, etc.), availability/seasonality, or any other suitable attributes of an item. Item data also may include images or videos of items, descriptions of items, or any other suitable types of information that may describe or identify items. Item data further may include information describing item locations associated with items within a source location. For example, item data may include information describing an aisle number and a shelf within a source location corresponding to an item location associated with an item. In some embodiments, information describing item locations associated with items within a source location includes a layout of the source location. A layout of a source location may describe an arrangement of aisles, departments, display tables or cases, etc. at the source location and a set of item locations within the source location associated with each item included among an inventory of the source location. In the above example, the aisle number and shelf may be indicated on an image corresponding to a layout of the source location. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular source location), the item data may include a time that the item was last found, a time that the item was last not found (a picker looked for the item but could not find it), the rate at which the item is found, or the popularity of the item.

An item category is a set of items that are a similar type of item. Items in an item category may be considered to be equivalent to each other or may be replacements for each other in an order. For example, different brands of sourdough bread may be different items, but these items may be in a "sourdough bread" item category. In some embodiments, item categories are broader in that the same item category may include item types that are related to a common theme, found in the same department, etc. For example, items such as apples, oranges, lettuce, and cucumbers may be included in a "produce" item category. As an additional example, items such as bread, pasta, and cookies that are gluten-free may be included in a "gluten-free" item category, while items such as tortilla chips and tofu that are non-GMO may be included in a "non-GMO" item category. Furthermore, in various embodiments, an item is included in multiple categories. For example, croissants may be included in a "croissant" item category, a "pastry" item category, and a "bakery" item category. The item categories may be human-generated and human-populated with items. The item categories also may be generated automatically by the online system 140 (e.g., using a clustering algorithm).

The item data also may include a hierarchical taxonomy into which items available at a source location are organized, in which different levels of the hierarchical taxonomy provide different levels of specificity about items included in the levels. The data collection module 200 may receive the hierarchical taxonomy from a source that operates the source location or it may generate the hierarchical taxonomy from the item data. The data collection module 200 may generate the hierarchical taxonomy by applying a trained classification model to the item data to include different items in levels of the hierarchical taxonomy, such that specific items are associated with item categories corresponding to levels within the hierarchical taxonomy. The data collection module 200 may maintain the hierarchical taxonomy (e.g., as new item data is received, as the item data is updated, etc.).

A hierarchical taxonomy may identify an item category and associate one or more specific items with the item category. For example, if an item category identifies "milk," a hierarchical taxonomy may associate identifiers of different milk items (e.g., milk having one or more different attributes) with the item category. Thus, the hierarchical taxonomy may maintain associations between an item category and specific items available at a source location matching the item category. Furthermore, different levels of the hierarchical taxonomy may identify items with differing levels of specificity based on any suitable attribute or combination of attributes of the items. For example, different levels of a hierarchical taxonomy may specify different combinations of attributes of items, such that items in lower levels of the hierarchical taxonomy share a greater number of attributes, corresponding to greater specificity in an item category, while items in higher levels of the hierarchical taxonomy share a fewer number of attributes, corresponding to less specificity in an item category. In this example, higher levels of the hierarchical taxonomy may include a greater number of items satisfying a broader item category, while lower levels of the hierarchical taxonomy may include a fewer number of items satisfying a more specific item category. The data collection module 200 may collect item data from a source computing system 120, a picker client device 110, or a user client device 100.

The data collection module 200 also collects picker data, which is information or data describing characteristics of pickers. For example, the picker data for a picker may include the picker's name, the picker's location, how often the picker has serviced orders for the online system 140, a user rating for the picker, the source locations from which the picker has collected items, or the picker's previous shopping history. Additionally, the picker data may include preferences expressed by the picker, such as their preferred source locations for collecting items, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data describing characteristics of an order. For example, order data may include item data for items that are included in an order, a delivery location for the order, a user associated with the order, a source location from which the user wants the ordered items collected, or a timeframe within which the user wants the order delivered. Order data may further include information describing how the order was serviced, such as which picker serviced the order, whether any items included in the order were not available, whether any items included in the order that were not available were replaced with other items, when the order was delivered, or a rating that the user gave the delivery of the order. In some embodiments, the order data include user data for users associated with the order, such as user data for a user who placed the order or picker data for a picker who serviced the order. In various embodiments, the order data also include feedback received from users associated with orders placed by the users. For example, order data may include information indicating a measure of satisfaction of a user with a replacement for an item included in an order placed by the user.

Similarly, the data collection module 200 may collect purchase data, which is information or data describing characteristics of a purchase by a user who collected and purchased items for themselves from a source location. The purchase data may include item data for items included in purchases, user data for users associated with purchases, or any other suitable types of information. For example, purchase data for a purchase may include item data for items that are included in the purchase, user data for a user who made the purchase, and information describing the purchase (e.g., a source location from which the user purchased the items and a date and time of the purchase).

In some embodiments, the data collection module 200 also may derive information from other data stored in the data store 240 and then store this derived information in the data store 240 (e.g., in association with the data from which it was derived). For example, based on order data describing an item included in an order placed by a user, a replacement for the item, and user feedback for the order indicating the user's satisfaction with the replacement, the data collection module 200 may derive information indicating whether the replacement is an acceptable replacement for the item for the user. In this example, if the feedback indicates the user was satisfied with the replacement, the data collection module 200 may derive information indicating the replacement is an acceptable replacement for the item for the user. Similarly, in this example, if the feedback indicates the user was not satisfied with the replacement, the data collection module 200 may derive information indicating the replacement is not an acceptable replacement for the item for the user.

While user data, picker data, item data, order data, and purchase data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. Components of the content presentation module 210 include: an interface module 211, a scoring module 212, a ranking module 213, and a selection module 214, which are further described below.

The interface module 211 generates and transmits an ordering interface for a user to order items. The interface module 211 populates the ordering interface with items that the user may select for adding to their order. In some embodiments, the interface module 211 presents a catalog of all items that are available to the user, which the user can browse to select items to order. Other components of the content presentation module 210 may identify items that the user is most likely to order and the interface module 211 may then present those items to the user. For example, the scoring module 212 may score items and the ranking module 213 may rank the items based on their scores. In this example, the selection module 214 may select items with scores that exceed some threshold (e.g., the top n items or the p percentile of items) and the interface module 211 then displays the selected items.

The interface module 211 also may receive a request from a picker client device 110 associated with a picker to recommend an acceptable replacement for an item for a user of the online system 140. The request may include information identifying or describing the item, the user, or a source location from which the picker is to collect the item. For example, the interface module 211 may receive, from a picker client device 110 associated with a picker servicing an order, a request to recommend an acceptable replacement for an item for a user who placed the order. In this example, the request may include a set of order data for the order that identifies the item (e.g., based on a serial number for the item), the user (e.g., based on the user's name and address), and the source location (e.g., based on information identifying a source that operates the source location and a geographical location of the source location).

In embodiments in which the interface module 211 receives a request from a picker client device 110 associated with a picker to recommend an acceptable replacement for an item for a user of the online system 140, the interface module 211 also may send information describing a set of replacements for the item for the user to the picker client device 110. The interface module 211 may send the information describing the set of replacements via a push notification, an email, or via any other suitable means. For example, suppose that the interface module 211 receives a request from a picker client device 110 associated with a picker to recommend an acceptable replacement for an item for a user of the online system 140. In this example, once the selection module 214 (described below) has selected a set of replacements for the item for the user, the interface module 211 may send information describing the set of replacements (e.g., a brand, an item category, and a size of each replacement) to the picker client device 110 via a push notification. Once sent to the picker client device 110, the picker client device 110 may display the information describing the set of replacements.

In embodiments in which the interface module 211 receives a request from a picker client device 110 associated with a picker to recommend an acceptable replacement for an item for a particular user of the online system 140, the scoring module 212 may retrieve various types of data from the data store 240. Examples of such types of data include a set of item data for a target item and for each candidate item included among an inventory of a source location, a set of user data for the user, or any other suitable types of data. As used herein, a "target item" is an item to be replaced, while a "candidate item" is an item that is potentially an acceptable replacement for the target item for a particular user of the online system 140. In some embodiments, a candidate item is any item included among the inventory of the source location, while in other embodiments, the scoring module 212 identifies each candidate item included among the inventory of the source location. In embodiments in which the scoring module 212 identifies each candidate item, the scoring module 212 may do so based on item data associated with the target item and the candidate item. For example, the scoring module 212 may identify a set of candidate items having at least a threshold measure of similarity to a target item based on a set of attributes of each candidate item and the target item.

The scoring module 212 also may generate a replacement score indicating whether a candidate item is an acceptable replacement for a target item for a particular user of the online system 140. The replacement score may correspond to a value (e.g., from zero to one) that indicates a measure of acceptability of the candidate item as a replacement for the target item for the user. For example, suppose that a replacement score indicating whether a candidate item is an acceptable replacement for a target item for a particular user of the online system 140 is a value from zero to one. In this example, a replacement score of zero may indicate that the candidate item is a poor replacement for the target item for the user and a replacement score of one may indicate that the candidate item is an excellent replacement for the target item for the user.

In some embodiments, the scoring module 212 generates a replacement score using a replacement prediction model, which is a machine-learning model trained to generate a replacement score. To use the replacement prediction model, the scoring module 212 may access the model (e.g., from the data store 240) and apply the model to a set of inputs. The set of inputs may include one or more types of data (e.g., user data, item data, etc.) retrieved by the scoring module 212 described above or any other suitable types of information. For example, the scoring module 212 may access and apply the replacement prediction model to a set of inputs including a set of user data for a user describing historical conversion or interaction information associated with the user, a set of preferences associated with the user, demographic or household information associated with the user, etc. In the above example, the set of inputs also may include a set of item data for a target item and a set of item data for a candidate item, such as a set of attributes (e.g., a brand, an item category, a price, a promotion, etc.) of both the target item and the candidate item. Once the scoring module 212 applies the replacement prediction model to the set of inputs, the scoring module 212 may receive an output from the model, which may include a value corresponding to a replacement score indicating whether a candidate item is an acceptable replacement for a target item for a particular user of the online system 140. In some embodiments, the replacement prediction model is trained by the machine-learning training module 230, as described below.

In embodiments in which the scoring module 212 generates a replacement score indicating whether a candidate item is an acceptable replacement for a target item for a particular user of the online system 140, the ranking module 213 may rank a set of candidate items. The ranking module 213 may do so based on a replacement score indicating whether each candidate item is an acceptable replacement for the target item for the user or based on any other suitable types of information. For example, the ranking module 213 may rank candidate items from highest to lowest based on a replacement score for each item, such that a candidate item associated with a highest replacement score is ranked first, a candidate item associated with a second-highest replacement score is ranked second, etc.

The selection module 214 may select a set of replacements for a target item for a particular user of the online system 140. The selection module 214 may select the set of replacements from a set of candidate items. The selection module 214 may do so based on a replacement score for each candidate item (e.g., by selecting a set of replacements that each have a replacement score that exceeds some threshold) or any other suitable types of information. In embodiments in which the ranking module 213 ranks the set of candidate items, the selection module 214 selects the set of replacements from the set of candidate items based on a ranking of the set of candidate items (e.g., by selecting a set of top-ranked candidate items).

The content presentation module 210 may use an item selection model to score items for presentation to a user. An item selection model is a machine-learning model that is trained to score items for a user based on item data for the items and user data for the user. For example, the item selection model may be trained to determine a likelihood that a user will order an item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from user client devices 100 and offers the orders to pickers for service based on picker data. For example, the order management module 220 offers an order to a picker based on the picker's location and the source location from which the ordered items are to be collected. The order management module 220 may also offer an order to a picker based on how many items are in the order, a vehicle operated by the picker, the delivery location, the picker's preferences for how far to travel to deliver an order, the picker's ratings by users, or how often the picker agrees to service an order.

In some embodiments, the order management module 220 determines when to offer an order to a picker based on a delivery timeframe requested by the user who placed the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions indicating how the picker may travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, order data, or purchase data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may generate a new training example for a training dataset. The machine-learning training module 230 may generate the new training example based on data stored in the data store 240 (e.g., item data, user data, etc.) or any other suitable types of data. In some embodiments, the training dataset is used to train a replacement prediction model. As described above, a replacement prediction model is a machine-learning model trained to generate a replacement score indicating whether a candidate item is an acceptable replacement for a target item for a particular user of the online system 140. In embodiments in which the machine-learning training module 230 generates a new training example for a training dataset used to train the replacement prediction model, the new training example may indicate whether an item is an acceptable replacement for another item for a user. For example, suppose that the availability determination module 260 (described below) determines that a first item is not available at a source location. In this example, once the replacement determination module 270 determines that a second item a user collected or purchased from the source location is a replacement for the first item, as described below, the machine-learning training module 230 may generate a new training example for a training dataset, in which the new training example indicates the second item is an acceptable replacement for the first item for the user. The new training example also may include additional types of information, such as a set of user data for a user, or any other suitable types of information. In the above example, the new training example also may include a set of user data for the user, such as a set of preferences of the user, household or demographic information associated with the user, etc.

In some embodiments, the machine-learning training module 230 also trains the replacement prediction model. The machine-learning training module 230 may train the replacement prediction model via supervised learning or using any other suitable technique or combination of techniques based on a training dataset, which may be generated by the machine-learning training module 230. To illustrate an example of how the machine-learning training module 230 may train the replacement prediction model, suppose that the machine-learning training module 230 receives a set of training examples. In the above example, the set of training examples may include a set of attributes of each of a set of items included among one or more inventories of one or more source locations (e.g., an item category, ingredients/materials, a version/variety, a size, a brand, a price, etc. associated with each item). In this example, the set of training examples also may include a set of attributes of each of multiple users of the online system 140 (e.g., a set of preferences of each user, household or demographic information associated with each user, etc.). In the above example, for each pair of items included among an inventory of a source location, the set of training examples also may include a label which represents an expected output of the replacement prediction model, in which the label indicates whether an item of the pair is an acceptable replacement for another item of the pair for a set of users of the online system 140. Continuing with this example, the machine-learning training module 230 may then train the replacement prediction model based on the sets of attributes, as well as the labels by comparing its output from input data of each training example to the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases in which the training example includes a label, the loss function is also based on the label for the training example. Some example loss functions include the mean square error function, the mean absolute error, the hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, purchase data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The location detection module 250 may retrieve various types of data from the data store 240. In some embodiments, the location detection module 250 retrieves a set of user data for a user including information captured by a gaze tracking device describing a gaze point of the user and image or video data captured within a source location, in which the image or video data depicts an environment of the user. In embodiments in which the location detection module 250 retrieves information describing a gaze point of a user and image or video data captured within a source location, the location detection module 250 also may retrieve information describing a time at which the information and image or video data were captured, information describing the source location, or any other suitable types of information. In various embodiments, the location detection module 250 also retrieves item data for one or more items available at the source location. As described above, item data may include information describing item locations associated with items within a source location, such as a layout of the source location that describes an arrangement of aisles, departments, display tables or cases, etc. at the source location and a set of item locations within the source location associated with each item included among an inventory of the source location.

The location detection module 250 also may detect, within a source location, an item location associated with an item that a user has expressed an intent to acquire from the source location. The user may express the intent to acquire the item from the source location in various ways. The user may express the intent to acquire the item from the source location if the item was included in a list (e.g., a shopping list) associated with the user for the source location. The user also may express the intent to acquire the item from the source location if the user searched for the item and was routed to an item location associated with the item (e.g., via a user client device 100, such as a smart shopping cart being used by the user to collect items in the source location). Additionally, the user may express the intent to acquire the item from the source location if a gaze point of the user matches the item location associated with the item or if the gaze point of the user is fixed on the item location associated with the item for at least a threshold amount of time.

In embodiments in which a user expresses an intent to acquire an item from a source location if a gaze point of the user matches an item location associated with the item, the location detection module 250 detects, within the source location, the item location associated with the item that matches the gaze point of the user. The location detection module 250 may do so based on information captured by a gaze tracking device describing the gaze point of the user, image or video data captured within the source location, item data for one or more items available at the source location, or any other suitable types of information. For example, the location detection module 250 may compare a gaze point of a user with a portion of an image or a video captured at a source location depicting an environment of the user, in which the portion of the image or the video matches the gaze point of the user. In this example, the location detection module 250 may detect an item location associated with an item that matches the gaze point of the user if the portion of the image or the video depicts the item location.

In embodiments in which a user expresses an intent to acquire an item from a source location if a gaze point of the user is fixed on an item location associated with the item for at least a threshold amount of time, the location detection module 250 determines whether the gaze point of the user is fixed for at least the threshold amount of time. In the above example, the location detection module 250 may first determine whether the gaze point of the user is fixed for at least three seconds. In this example, if the gaze point of the user is fixed for at least three seconds, the location detection module 250 detects the item location associated with the item that matches the gaze point of the user.

In some embodiments, the location detection module 250 detects, within a source location, an item location associated with an item that matches a gaze point of a user by applying one or more computer vision algorithms to image or video data captured within the source location or by applying one or more natural language processing (NLP) techniques to text included in the image or video data. For example, suppose that the location detection module 250 applies one or more computer vision algorithms, such as you only look once (YOLO), optical character recognition (OCR), etc. to a portion of a video captured at a source location to identify a shelf within the source location that matches a gaze point of a user, as well as a label on the shelf. In this example, suppose also that the location detection module 250 applies one or more NLP techniques to text included in the label on the shelf to determine that the text includes information describing the item (e.g., a serial number, a brand, an item category, a price, etc. associated with the item). In this example, based on the text and item data for the item retrieved by the location detection module 250, the location detection module 250 may detect that the shelf depicted in the video that matches the gaze point of the user is an item location associated with the item.

The location detection module 250 also may detect, within a source location, an item location associated with an item that matches a gaze point of a user based on a layout of the source location or any other suitable types of information. The location detection module 250 may do so by comparing a portion of image or video data captured within the source location that matches the gaze point of the user with the layout of the source location. The location detection module 250 may then detect the item location associated with the item that matches the gaze point of the user based on the comparison. In the above example, suppose that the video does not depict the label on the shelf and that the location detection module 250 has retrieved a layout of the source location describing a set of item locations within the source location associated with each item included among an inventory of the source location. Continuing with this example, the location detection module 250 may compare the shelf depicted in the video that matches the gaze point of the user with the layout. In this example, if the layout indicates the shelf corresponds to the item location associated with the item, the location detection module 250 may detect that the shelf depicted in the video that matches the gaze point of the user is the item location associated with the item.

The availability determination module 260 may determine whether an item is available at a source location. The availability determination module 260 may make the determination based on image or video data captured within the source location, a set of item data for the item, or any other suitable types of information. To make the determination, the availability determination module 260 may apply one or more computer vision algorithms to the image or video data to detect one or more objects depicted in the image or video data or apply one or more natural language processing (NLP) techniques to text included in the image or video data. The availability determination module 260 may then compare each object detected in the image or video data with images or videos of the item or by comparing text included in the image or video data with text associated with the item and determine whether the item is available at the source location based on the comparison.

The following illustrates an example of how the availability determination module 260 may determine whether an item corresponding to brand C canned peaches is available at a source location. Suppose that the availability determination module 260 applies one or more computer vision algorithms to a video captured at a source location during a shopping session of a user to detect various objects depicted in the video. In this example, if no objects are detected within an item location associated with the item, the availability determination module 260 may determine that the item is not available at the source location. Alternatively, in this example, if one or more objects are detected within the item location or elsewhere within the source location, the availability determination module 260 may compare each object with one or more images or videos of the item included among a set of item data for the item to determine whether the object matches the image(s) or video(s). Continuing with this example, the availability determination module 260 may determine that the item is available at the source location if the object(s) match the image(s) or video (s) of the item or that the item is not available at the source location if none of the objects match the image(s) or video(s) of the item. In the above example, the availability determination module 260 also may apply one or more NLP techniques to text included on a label of each object (e.g., text describing a brand, an item category, etc.). In this example, the availability determination module 260 may compare this text with text associated with the item (e.g., text describing brand C, a "canned peaches" item category, etc.) included among the set of item data for the item to determine whether the text included on the label matches the text associated with the item. Continuing with this example, the availability determination module 260 may determine that the item is available at the source location if the text included on the label(s) matches the text associated with the item or that the item is not available at the source location if none of the text included on the label(s) matches the text associated with the item.

If a first item is not available at a source location, the replacement determination module 270 determines whether a second item a user collected or purchased from the source location is a replacement for the first item. The replacement determination module 270 may do so based on a proximity between a location at which the user collected the second item and an item location associated with the first item or an amount of time that elapsed between a time that a gaze point of the user matched the item location associated with the first item and a time that the user collected the second item. The replacement determination module 270 also may determine whether the second item is a replacement for the first item based on a measure of similarity between the items, a hierarchical taxonomy into which the items are organized, a replacement score indicating whether the second item is an acceptable replacement for the first item, or any other suitable factors. Once the replacement determination module 270 determines that the second item is a replacement for the first item, the replacement determination module 270 may communicate information describing the items and the user to the data collection module 200, which may store information indicating the second item is an acceptable replacement for the first item for the user.

The following illustrates an example of how, if a first item is not available at a source location, the replacement determination module 270 may determine whether a second item a user collected or purchased from the source location is a replacement for the first item based on one or more factors. In this example, the replacement determination module 270 may determine that the second item is a replacement for the first item if a distance between a location at which the user collected the second item and an item location associated with the first item is less than a threshold distance. In the above example, the replacement determination module 270 may make the same determination if less than a threshold amount of time elapsed between a time that a gaze point of the user matched the item location associated with the first item and a time that the user collected the second item. In this example, the replacement determination module 270 also may make this determination if one or more attributes of the items (e.g., one or more item categories, brands, sizes, ingredients, etc.) have at least a threshold measure of similarity to each other or if a level of a hierarchical taxonomy in which the items are included corresponds to at least a threshold measure of specificity. Continuing with this example, the replacement determination module 270 may make this same determination if a replacement score indicating whether the second item is an acceptable replacement for the first item for the user is at least a threshold score. In the above example, the replacement determination module 270 may determine that the second item is not a replacement for the first item if the opposite is true for one or more of the factors (e.g., if the distance is at least the threshold distance, if at least the threshold amount of time has elapsed, etc.).

The following illustrates an additional example of how, if a first item is not available at a source location, the replacement determination module 270 may determine whether a second item a user collected or purchased from the source location is a replacement for the first item based on one or more factors. In the above example, suppose that the replacement determination module 270 associates a set of weights with the factor(s), such that each factor may be associated with a score and a weight. In this example, the replacement determination module 270 may compute a first score that is inversely proportional to the distance between the location at which the user collected the second item and the item location associated with the first item. Continuing with this example, the replacement determination module 270 also may compute a second score that is inversely proportional to the amount of time that elapsed between the time that the gaze point of the user matched the item location associated with the first item and the time that the user collected the second item. In this example, the replacement determination module 270 further may compute a third score that is proportional to the measure of similarity between the items, a fourth score that is proportional to the measure of specificity of the level of the hierarchical taxonomy in which the items are included, or a fifth score that is proportional to the replacement score indicating whether the second item is an acceptable replacement for the first item for the user. Continuing with this example, the replacement determination module 270 may compute an overall score that is a weighted average of the scores. In this example, the replacement determination module 270 may determine that the second item is a replacement for the first item if the overall score is at least a threshold score. Alternatively, in this example, the replacement determination module 270 may determine that the second item is not a replacement for the first item if the overall score is less than the threshold score.

Figure 3:
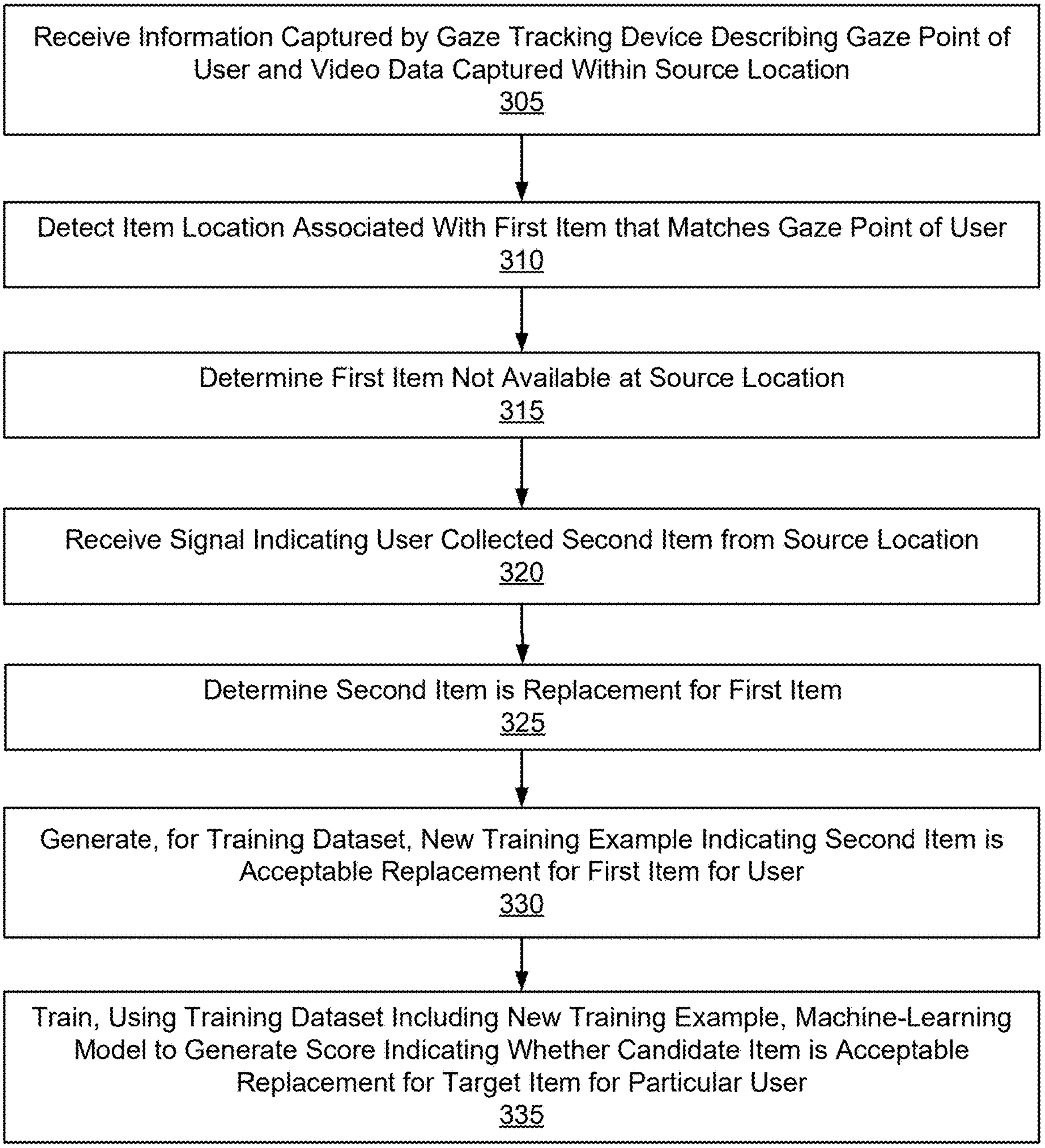
FIG. 3 is a flowchart of a method for generating training data for a machine-learning model that scores candidate items as replacements for a target item for a user based on a user gaze point captured at a source location, in accordance with one or more embodiments.

Generating Training Data for a Machine-Learning Model That Scores Candidate Items as Replacements for a Target Item for a User Based on a User Gaze Point Captured at a Source Location FIG. 3 is a flowchart for a method of generating training data for a machine-learning model that scores candidate items as replacements for a target item for a user based on a user gaze point captured at a source location, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

A gaze tracking device (e.g., a headset) may capture information describing a position and an orientation of one or both eyes of a user, image or video data depicting an environment of the user within a source location, or any other suitable types of information. The gaze tracking device may do so via one or more cameras included in the gaze tracking device or via any other suitable means. The gaze tracking device may be a user client device 100 or a source computing system 120 that operates as the gaze tracking device or any other suitable type of device capable of tracking a gaze of the user. The gaze tracking device may track the gaze of the user based on the position and orientation of each eye, as well as the image or video data (e.g., such that a gaze point of the user corresponds to a point in space depicted in the image or video data at which gaze lines for the eyes of the user intersect).

The online system 140 receives 305 (e.g., via the data collection module 200) information captured by the gaze tracking device describing the gaze point of the user and the image or video data captured within the source location. In some embodiments, once the online system 140 receives 305 the information describing the gaze point of the user and the image or video data, it stores (e.g., using the data collection module 200) the information describing the gaze point of the user and the image or video data (e.g., among a set of user data for the user in the data store 240). In such embodiments, the online system 140 may store the information describing the gaze point of the user and the image or video data in association with a time at which it was captured, information describing the user, information describing the source location, or any other suitable types of information.

The online system 140 may then retrieve (e.g., using the location detection module 250) various types of data (e.g., from the data store 240). In some embodiments, the online system 140 retrieves a set of user data for the user including the information captured by the gaze tracking device describing the gaze point of the user and the image or video data captured within the source location. In embodiments in which the online system 140 retrieves the information describing the gaze point of the user and the image or video data captured within the source location, the online system

140 also may retrieve information describing a time at which the information and image or video data were captured, information describing the source location, or any other suitable types of information. In various embodiments, the online system 140 also retrieves item data for one or more items available at the source location. The item data may include information describing item locations associated with items within the source location, such as a layout of the source location that describes an arrangement of aisles, departments, display tables or cases, etc. at the source location and a set of item locations within the source location associated with each item included among an inventory of the source location.

The online system 140 also may detect (e.g., using the location detection module 250) within the source location, an item location associated with a first item that the user has expressed an intent to acquire from the source location. The user may express the intent to acquire the first item from the source location in various ways. The user may express the intent to acquire the first item from the source location if the first item was included in a list (e.g., a shopping list) associated with the user for the source location. The user also may express the intent to acquire the first item from the source location if the user searched for the first item and was routed to an item location associated with the first item (e.g., via a user client device 100, such as a smart shopping cart being used by the user to collect items in the source location). Additionally, the user may express the intent to acquire the first item from the source location if the gaze point of the user matches the item location associated with the first item or if the gaze point of the user is fixed on the item location associated with the first item for at least a threshold amount of time.

Figure 4A:
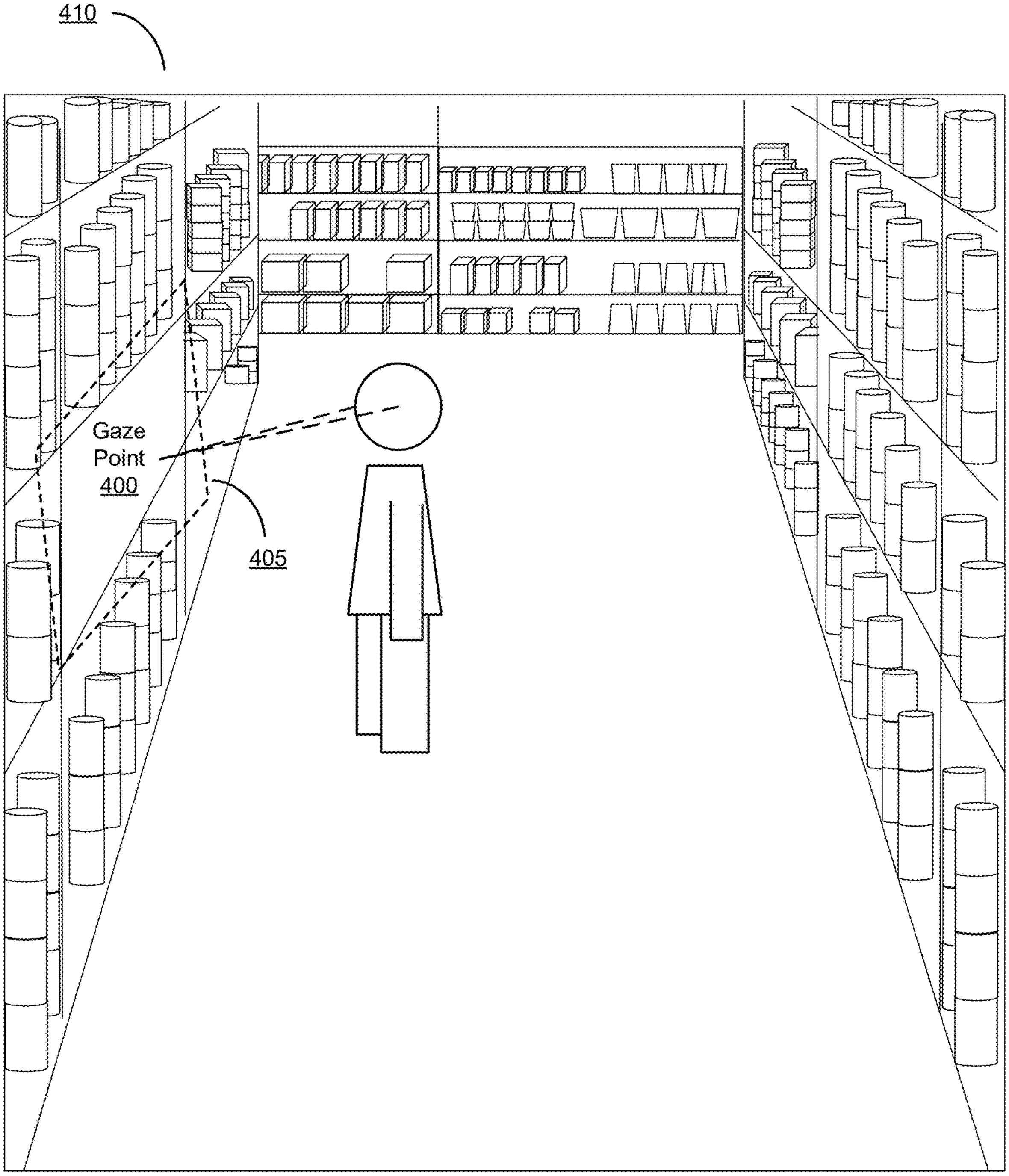
FIG. 4A illustrates an example of information captured by a gaze tracking device describing a gaze point of a user and video data captured within a source location, in accordance with one or more embodiments.

In embodiments in which the user expresses the intent to acquire the first item from the source location if the gaze point of the user matches the item location associated with the first item, the online system 140 detects 310 (e.g., using the location detection module 250), within the source location, the item location associated with the first item that matches the gaze point of the user. The online system 140 may do so based on the information captured by the gaze tracking device describing the gaze point of the user, the image or video data captured within the source location, item data for one or more items available at the source location, or any other suitable types of information. FIG. 4A illustrates an example of information captured by a gaze tracking device describing a gaze point of a user and video data captured within a source location, in accordance with one or more embodiments. As shown in the example of FIG. 4A, the online system 140 may compare the gaze point 400 of the user with a portion 405 of a video 410 captured at the source location that matches the gaze point 400 of the user. In this example, the online system 140 may detect 310 the item location associated with the first item that matches the gaze point 400 of the user if the portion 405 of the video 410 depicts the item location.

In embodiments in which the user expresses the intent to acquire the first item from the source location if the gaze point 400 of the user is fixed on the item location associated with the first item for at least a threshold amount of time, the online system 140 determines (e.g., using the location detection module 250) whether the gaze point 400 of the user is fixed for at least the threshold amount of time. In the above example, the online system 140 may first determine whether the gaze point 400 of the user is fixed for at least three seconds. In this example, if the gaze point 400 of the user is fixed for at least three seconds, the online system 140 detects 310 the item location associated with the first item that matches the gaze point 400 of the user.

Figure 4B:
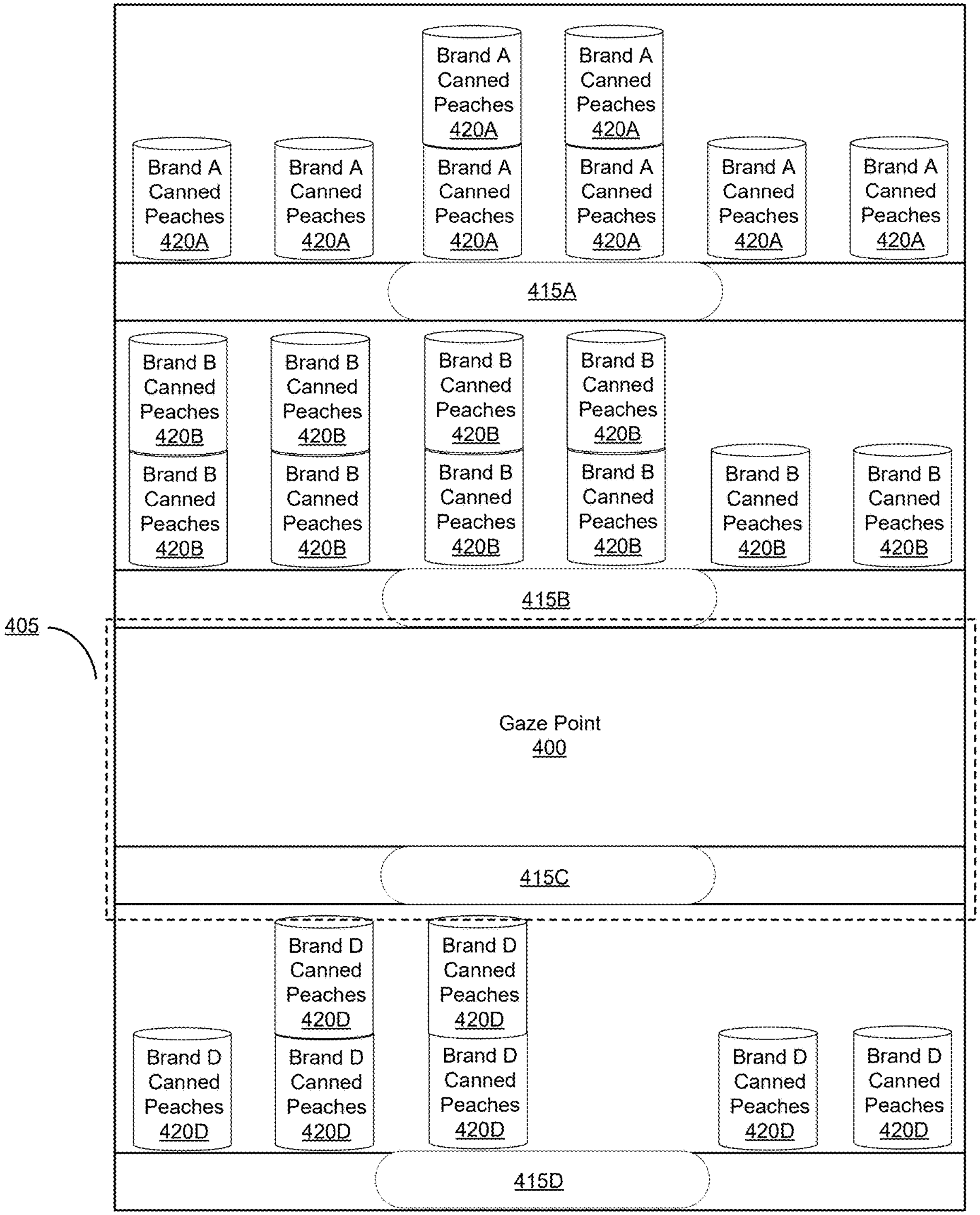
FIG. 4B illustrates an example of an item location associated with an item at a source location, in accordance with one or more embodiments.

In some embodiments, the online system 140 detects 310, within the source location, the item location associated with the first item that matches the gaze point 400 of the user by applying (e.g., using the location detection module 250) one or more computer vision algorithms to the image or video data captured within the source location or by applying (e.g., using the location detection module 250) one or more natural language processing (NLP) techniques to text included in the image or video data. FIG. 4B illustrates an example of an item location associated with an item at a source location, in accordance with one or more embodiments, and continues the example described above with respect to FIG. 4A. As shown in FIG. 4B, suppose that the online system 140 applies one or more computer vision algorithms, such as you only look once (YOLO), optical character recognition (OCR), etc. to the portion 405 of the video 410 captured at the source location to identify a shelf within the source location that matches the gaze point 400 of the user, as well as a label 415C on the shelf. In this example, suppose also that the online system 140 applies one or more NLP techniques to text included in the label 415C on the shelf to determine that the text includes information (e.g., a serial number, a brand, an item category, a price, etc.) describing brand C canned peaches. In the above example, based on the text and item data for the first item retrieved by the online system 140, the online system 140 may detect 310 that the shelf depicted in the video 410 that matches the gaze point 400 of the user is an item location associated with brand C canned peaches.

The online system 140 also may detect 310, within the source location, the item location associated with the first item that matches the gaze point 400 of the user based on the layout of the source location or any other suitable types of information. The online system 140 may do so by comparing (e.g., using the location detection module 250) the portion 405 of the image or video data captured within the source location that matches the gaze point 400 of the user with the layout of the source location. The online system 140 may then detect 310 the item location associated with the first item that matches the gaze point 400 of the user based on the comparison. In the above example, suppose that the video 410 does not depict the label 415C on the shelf and that the online system 140 has retrieved the layout of the source location describing a set of item locations within the source location associated with each item included among the inventory of the source location. Continuing with this example, the online system 140 may compare the shelf depicted in the video 410 that matches the gaze point 400 of the user with the layout. In this example, if the layout indicates the shelf corresponds to the item location associated with brand C canned peaches, the online system 140 may detect 310 that the shelf depicted in the video 410 that matches the gaze point 400 of the user is the item location associated with brand C canned peaches.

Referring back to FIG. 3, the online system 140 may then determine 315 (e.g., using the availability determination module 260) whether the first item associated with the item location that matches the gaze point 400 of the user is available at the source location. The online system 140 may make the determination based on the image or video data captured within the source location, a set of item data for the first item, or any other suitable types of information. To make the determination, the online system 140 may apply (e.g., using the availability determination module 260) one or more computer vision algorithms to the image or video data to detect one or more objects depicted in the image or video data or apply (e.g., using the availability determination module 260) one or more natural language processing (NLP) techniques to text included in the image or video data. The online system 140 may then compare (e.g., using the availability determination module 260) each object detected in the image or video data with images or videos 410 of the first item or by comparing text included in the image or video data with text associated with the first item and determine 315 whether the first item is available at the source location based on the comparison.

The following illustrates an example of how the online system 140 may determine 315 whether the first item associated with the item location that matches the gaze point 400 of the user is available at the source location. Suppose that the online system 140 applies one or more computer vision algorithms to the video 410 captured at the source location during a shopping session of the user to detect various objects depicted in the video 410. As shown in the example of FIG. 4B, if no objects are detected within the item location associated with the first item (i.e., the shelf associated with brand C canned peaches), the online system 140 may determine 315 that the first item is not available at the source location. Alternatively, in this example, if one or more objects are detected within the item location or elsewhere within the source location, the online system 140 may compare each object with one or more images or videos 410 of the first item included among a set of item data for the first item to determine whether the object matches the image(s) or video(s) 410. Continuing with this example, the online system 140 may determine 315 that the first item is available at the source location if the object(s) match the image(s) or video(s) 410 or that the first item is not available at the source location if none of the objects match the image(s) or video(s) 410. In the above example, the online system 140 also may apply one or more NLP techniques to text included on the packaging for each object (e.g., text describing a brand, an item category, etc.) and compare this text with text associated with the first item (e.g., text describing brand C, a "canned peaches" item category, etc.) included among the set of item data for the first item to determine whether they match. Continuing with this example, the online system 140 may determine 315 that the first item is available at the source location if they match or that the first item is not available at the source location if they do not match, as shown in FIG. 4B.

Figure 4C:
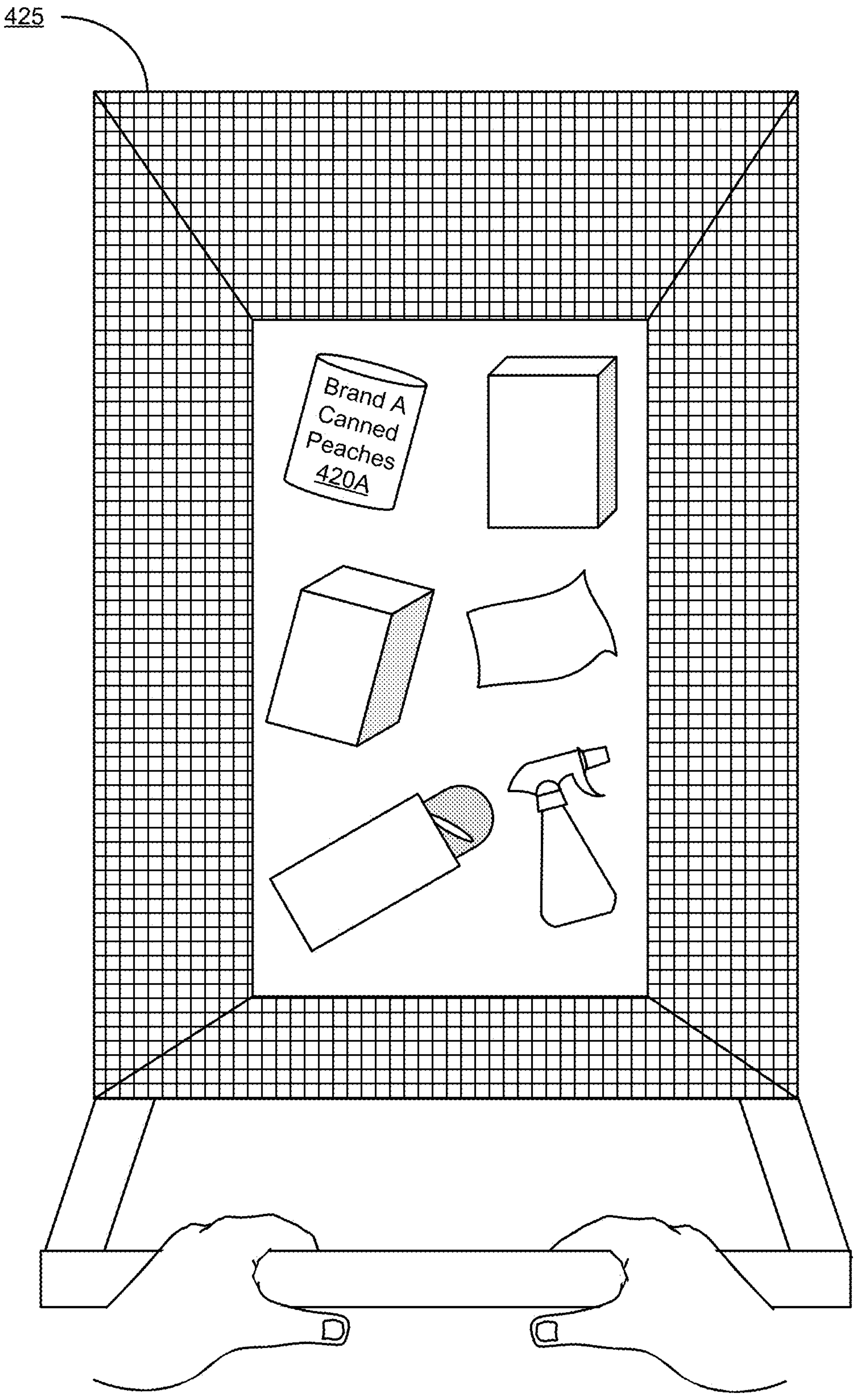
FIG. 4C illustrates an example of a signal indicating that a user collected an item from a source location, in accordance with one or more embodiments.

Referring again to FIG. 3, if the online system 140 determines 315 that the first item associated with the item location that matches the gaze point 400 of the user is not available at the source location, the online system 140 may receive 320 (e.g., via the data collection module 200) a signal indicating that the user collected or purchased a second item from the source location. The online system 140 may receive 320 the signal from a user client device 100 associated with the user, from a source computing system 120 associated with the source location, or from any other suitable source. FIG. 4C illustrates an example of a signal indicating that a user collected an item from a source location, in accordance with one or more embodiments, and continues the example described above in conjunction with FIG. 4A-4B. As shown in FIG. 4C, the online system 140 may receive 320 the signal from a user client device 100 associated with the user corresponding to a smart shopping cart 425. In this example, once the smart shopping cart 425 receives information describing the second item corresponding to brand A canned peaches 420A collected by the user and stored in a storage area of the smart shopping cart 425, the smart shopping cart 425 may communicate the information to the online system 140.

Referring back to FIG. 3, the online system 140 then determines 325 (e.g., using the replacement determination module 270) whether the second item the user collected or purchased from the source location is a replacement for the first item. The online system 140 may do so based on a proximity between a location at which the user collected the second item and the item location associated with the first item or an amount of time that elapsed between a time that the gaze point 400 of the user matched the item location associated with the first item and a time that the user collected the second item. The online system 140 also may determine 325 whether the second item is a replacement for the first item based on a measure of similarity between the items, a hierarchical taxonomy into which the items are organized, a replacement score indicating whether the second item is an acceptable replacement for the first item, or any other suitable factors. Once the online system 140 determines 325 that the second item is a replacement for the first item, the online system 140 may store (e.g., using the data collection module 200) information indicating the second item is an acceptable replacement for the first item for the user (e.g., among a set of user data for the user in the data store 240).

Furthermore, once the online system 140 determines 325 that the second item is a replacement for the first item, the online system 140 may generate 330 (e.g., using the machine-learning training module 230) a new training example for a training dataset (e.g., based on item data, user data, etc. stored in the data store 240 or any other suitable types of data). The new training example may indicate that the second item is an acceptable replacement for the first item for the user. For example, if the online system 140 determines 325 that the second item corresponding to brand A canned peaches 420A collected by the user shown in FIG. 4C is a replacement for the first item corresponding to brand C canned peaches, the online system 140 may generate 330 the new training example for the training dataset indicating that brand A canned peaches 420A are an acceptable replacement for brand C canned peaches for the user. The new training example also may include additional types of information, such as a set of user data for the user, or any other suitable types of information.

Referring once more to FIG. 3, the online system 140 may then train 335 (e.g., using the machine-learning training module 230) the replacement prediction model. As described above, the replacement prediction model is a machine-learning model trained 335 to generate a replacement score indicating whether a candidate item is an acceptable replacement for a target item for a particular user of the online system 140. The online system 140 may train 335 the replacement prediction model via supervised learning or using any other suitable technique or combination of techniques based on the training dataset that includes the new training example generated 330 by the online system 140.

To illustrate an example of how the online system 140 may train 335 the replacement prediction model, suppose that the online system 140 receives (e.g., via the machine-learning training module 230) a set of training examples. In the above example, the set of training examples may include a set of attributes of each of a set of items included among one or more inventories of one or more source locations (e.g., an item category, ingredients/materials, a version/variety, a size, a brand, a price, etc. associated with each item). In this example, the set of training examples also may include a set of attributes of each of multiple users of the online system 140 (e.g., a set of preferences of each user, household or demographic information associated with each user, etc.). In the above example, for each pair of items included among an inventory of a source location, the set of training examples also may include a label which represents an expected output of the replacement prediction model, in which the label indicates whether an item of the pair is an acceptable replacement for another item of the pair for a set of users of the online system 140. Continuing with this example, the online system 140 may then train 335 the replacement prediction model based on the sets of attributes, as well as the labels by comparing its output from input data of each training example to the label for the training example.

The online system 140 subsequently may receive (e.g., via the interface module 211) a request from a picker client device 110 associated with a picker to recommend an acceptable replacement for the first item for an additional user of the online system 140. The request received by the online system 140 may include information identifying or describing the first item, the additional user, or a source location from which the picker is to collect the first item. The online system 140 may then retrieve (e.g., from the data store 240 using the scoring module 212) various types of data, such as a set of item data for a target item (i.e., the first item) and for each candidate item included among an inventory of the source location, a set of user data for the additional user, etc. In some embodiments, a candidate item is any item included among the inventory of the source location, while in other embodiments, the online system 140 identifies (e.g., using the scoring module 212) each candidate item included among the inventory of the source location (e.g., based on item data associated with the target item and the candidate item).

The online system 140 may then generate (e.g., using the scoring module 212) a replacement score indicating whether each candidate item is an acceptable replacement for the target item for the additional user. The replacement score may correspond to a value (e.g., from zero to one) that indicates a measure of acceptability of the candidate item as a replacement for the target item for the additional user. In some embodiments, the online system 140 generates a replacement score using the replacement prediction model. To use the replacement prediction model, the online system 140 may access (e.g., using the scoring module 212) the model (e.g., from the data store 240) and apply (e.g., using the scoring module 212) the model to a set of inputs. The set of inputs may include one or more types of data (e.g., user data, item data, etc.) retrieved by the online system 140 described above or any other suitable types of information. Once the online system 140 applies the replacement prediction model to the set of inputs, the online system 140 may receive (e.g., via the scoring module 212) an output from the model, which may include a value corresponding to a replacement score indicating whether a candidate item is an acceptable replacement for the target item for the additional user.

The online system 140 may then select (e.g., using the selection module 214) a set of replacements for the target item for the additional user from a set of candidate items included among the inventory of the source location. The online system 140 may select the set of replacements based on a replacement score for each candidate item (e.g., by selecting a set of replacements that each have a replacement score that exceeds some threshold) or based on any other suitable types of information. The online system 140 also may rank (e.g., using the ranking module 213) the set of candidate items based on a replacement score indicating whether each candidate item is an acceptable replacement for the target item for the additional user or based on any other suitable types of information. In embodiments in which the online system 140 ranks the set of candidate items, the online system 140 may select the set of replacements from the set of candidate items based on a ranking of the set of candidate items (e.g., by selecting a set of top-ranked candidate items).

Once the online system 140 selects the set of replacements for the target item for the additional user, the online system 140 may send (e.g., using the interface module 211) information describing the set of replacements for the target item for the additional user to the picker client device 110. The online system 140 may send the information describing the set of replacements via a push notification, an email, or via any other suitable means. Once sent to the picker client device 110, the picker client device 110 may display the information describing the set of replacements.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving, at an online system, information captured by a gaze tracking device describing a gaze point of a user and video data captured within a source location;

detecting, within the source location, an item location associated with a first item that matches the gaze point of the user based at least in part on the received information;

determining that the first item is not available at the source location based at least in part on the video data;

receiving a signal indicating that the user collected a second item from the source location;

determining that the second item is a replacement for the first item;

generating a new training example for a training dataset, wherein the new training example indicates the second item is an acceptable replacement for the first item for the user;

training a machine-learning model to generate a score indicating whether a candidate item is an acceptable replacement for a target item for a particular user of the online system, wherein the machine-learning model is trained using the training dataset that includes the new training example; and storing parameters of the trained machine-learning model on a non-transitory computer-readable medium.

2. The method of claim 1, wherein detecting, within the source location, the item location associated with the first item that matches the gaze point of the user based at least in part on the received information comprises:

detecting, within the source location, the item location associated with the first item that matches the gaze point of the user based on a layout of the source location, wherein the layout of the source location describes a set of item locations within the source location associated with each item of a plurality of items included among an inventory of the source location.

3. The method of claim 2, wherein detecting, within the source location, the item location associated with the first item that matches the gaze point of the user based on the layout of the source location comprises:

comparing a portion of the video data that matches the gaze point of the user with the layout of the source location; and detecting, within the source location, the item location associated with the first item that matches the gaze point of the user based at least in part on the comparing.

4. The method of claim 1, wherein detecting, within the source location, the item location associated with the first item that matches the gaze point of the user based at least in part on the received information comprises:

applying one or more computer vision algorithms to a portion of the video data that matches the gaze point of the user to detect the item location associated with the first item that matches the gaze point of the user.

5. The method of claim 1, wherein determining that the first item is not available at the source location based at least in part on the video data comprises:

accessing an image of the first item;

applying one or more computer vision algorithms to the video data to detect one or more objects depicted in the video data;

determining whether the one or more objects depicted in the video data match the image of the first item; and responsive to determining that the one or more objects depicted in the video data do not match the image of the first item, determining that the first item is not available at the source location.

6. The method of claim 1, wherein generating the new training example for the training dataset comprises:

including, in the new training example, a set of user data for the user, wherein the set of user data for the user comprises a set of preferences of the user.

7. The method of claim 6, wherein training the machine-learning model to generate the score indicating whether a candidate item is an acceptable replacement for a target item for a particular user of the online system comprises:

receiving item data for a plurality of items included among one or more inventories of one or more source locations;

receiving user data for a plurality of users of the online system;

receiving, for each pair of an item and an additional item included among the plurality of items, a label indicating whether the item is an acceptable replacement for the additional item for a set of users of the online system; and training the machine-learning model based at least in part on the item data, the user data, and the label for each pair of an item and an additional item included among the plurality of items.

8. The method of claim 1, wherein determining that the second item is a replacement for the first item is based at least in part on one or more of: a measure of similarity between the first item and the second item, a hierarchical taxonomy into which the first item and the second item are organized, a proximity between the item location associated with the first item and a location at which the second item was collected, an amount of time elapsed since a time that the gaze point of the user matched the item location associated with the first item and a time that the user collected the second item, or the score indicating whether the second item is an acceptable replacement for the first item.

9. The method of claim 1, further comprising:

receiving a request from a client device associated with a picker to recommend an acceptable replacement for the first item for an additional user of the online system, wherein the request includes information describing the source location;

retrieving a set of item data for the first item and for each candidate item of a set of candidate items included among an inventory of the source location;

retrieving a set of user data for the additional user;

accessing the machine-learning model trained to generate the score indicating whether a candidate item is an acceptable replacement for a target item for a particular user of the online system;

for each candidate item of the set of candidate items, applying the machine-learning model to generate the score indicating whether a corresponding candidate item is an acceptable replacement for the first item for the additional user of the online system based at least in part on the set of user data for the additional user and the set of item data for the first item and the corresponding candidate item;

ranking the set of candidate items based at least in part on the score indicating whether each candidate item is an acceptable replacement for the first item for the additional user;

selecting, from the set of candidate items, a replacement for the first item for the additional user based at least in part on the ranking; and storing parameters of the trained machine-learning model on the non-transitory computer-readable medium.

10. The method of claim 9, further comprising:

sending information describing the selected replacement for the first item for the additional user to the client device associated with the picker.

11. A computer program product comprising a non-transitory computer-readable storage medium having instructions encoded thereon that, when executed by a processor, cause the processor to perform steps comprising:

receiving, at an online system, information captured by a gaze tracking device describing a gaze point of a user and video data captured within a source location;

detecting, within the source location, an item location associated with a first item that matches the gaze point of the user based at least in part on the received information;

determining that the first item is not available at the source location based at least in part on the video data;

receiving a signal indicating that the user collected a second item from the source location;

determining that the second item is a replacement for the first item;

generating a new training example for a training dataset, wherein the new training example indicates the second item is an acceptable replacement for the first item for the user; and training a machine-learning model to generate a score indicating whether a candidate item is an acceptable replacement for a target item for a particular user of the online system, wherein the machine-learning model is trained using the training dataset that includes the new training example.

12. The computer program product of claim 11, wherein detecting, within the source location, the item location associated with the first item that matches the gaze point of the user based at least in part on the received information comprises:

detecting, within the source location, the item location associated with the first item that matches the gaze point of the user based on a layout of the source location, wherein the layout of the source location describes a set of item locations within the source location associated with each item of a plurality of items included among an inventory of the source location.

13. The computer program product of claim 12, wherein detecting, within the source location, the item location associated with the first item that matches the gaze point of the user based on the layout of the source location comprises:

comparing a portion of the video data that matches the gaze point of the user with the layout of the source location; and detecting, within the source location, the item location associated with the first item that matches the gaze point of the user based at least in part on the comparing.

14. The computer program product of claim 11, wherein detecting, within the source location, the item location associated with the first item that matches the gaze point of the user based at least in part on the received information comprises:

applying one or more computer vision algorithms to a portion of the video data that matches the gaze point of the user to detect the item location associated with the first item that matches the gaze point of the user.

15. The computer program product of claim 11, wherein determining that the first item is not available at the source location based at least in part on the video data comprises:

accessing an image of the first item;

applying one or more computer vision algorithms to the video data to detect one or more objects depicted in the video data;

determining whether the one or more objects depicted in the video data match the image of the first item; and responsive to determining that the one or more objects depicted in the video data do not match the image of the first item, determining that the first item is not available at the source location.

16. The computer program product of claim 11, wherein generating the new training example for the training dataset comprises:

including, in the new training example, a set of user data for the user, wherein the set of user data for the user comprises a set of preferences of the user.

17. The computer program product of claim 16, wherein training the machine-learning model to generate the score indicating whether a candidate item is an acceptable replacement for a target item for a particular user of the online system comprises:

receiving item data for a plurality of items included among one or more inventories of one or more source locations;

receiving user data for a plurality of users of the online system;

receiving, for each pair of an item and an additional item included among the plurality of items, a label indicating whether the item is an acceptable replacement for the additional item for a set of users of the online system; and training the machine-learning model based at least in part on the item data, the user data, and the label for each pair of an item and an additional item included among the plurality of items.

18. The computer program product of claim 11, wherein determining that the second item is a replacement for the first item is based at least in part on one or more of: a measure of similarity between the first item and the second item, a hierarchical taxonomy into which the first item and the second item are organized, a proximity between the item location associated with the first item and a location at which the second item was collected, an amount of time elapsed since a time that the gaze point of the user matched the item location associated with the first item and a time that the user collected the second item, or the score indicating whether the second item is an acceptable replacement for the first item.

19. The computer program product of claim 11, wherein the computer-readable storage medium further has instructions encoded thereon that, when executed by the processor, cause the processor to perform steps comprising:

receiving a request from a client device associated with a picker to recommend an acceptable replacement for the first item for an additional user of the online system, wherein the request includes information describing the source location;

retrieving a set of item data for the first item and for each candidate item of a set of candidate items included among an inventory of the source location;

retrieving a set of user data for the additional user;

accessing the machine-learning model trained to generate the score indicating whether a candidate item is an acceptable replacement for a target item for a particular user of the online system;

for each candidate item of the set of candidate items, applying the machine-learning model to generate the score indicating whether a corresponding candidate item is an acceptable replacement for the first item for the additional user of the online system based at least in part on the set of user data for the additional user and the set of item data for the first item and the corresponding candidate item;

ranking the set of candidate items based at least in part on the score indicating whether each candidate item is an acceptable replacement for the first item for the additional user;

selecting, from the set of candidate items, a replacement for the first item for the additional user based at least in part on the ranking; and sending information describing the selected replacement for the first item for the additional user to the client device associated with the picker.

20. A computer system comprising:

a processor; and a non-transitory computer-readable storage medium storing instructions that, when executed by the processor, perform actions comprising:

receiving, at an online system, information captured by a gaze tracking device describing a gaze point of a user and video data captured within a source location;

detecting, within the source location, an item location associated with a first item that matches the gaze point of the user based at least in part on the received information;

determining that the first item is not available at the source location based at least in part on the video data;

receiving a signal indicating that the user collected a second item from the source location;

determining that the second item is a replacement for the first item;

generating a new training example for a training dataset, wherein the new training example indicates the second item is an acceptable replacement for the first item for the user;

training a machine-learning model to generate a score indicating whether a candidate item is an acceptable replacement for a target item for a particular user of the online system, wherein the machine-learning model is trained using the training dataset that includes the new training example; and storing parameters of the trained machine-learning model on a non-transitory computer-readable medium.

* * * * *